United States Patent
Brady et al.

(10) Patent No.: US 6,257,069 B1
(45) Date of Patent: Jul. 10, 2001

(54) BAYARD-ALPERT VACUUM GAUGE WITH NEUTRALIZATION OF X-RAY EFFECT

(75) Inventors: Howard M. Brady, North Arlington, NJ (US); Emil Drubetsky, Philadelphia, PA (US); Ronald H. Goehner, Wayne, NJ (US); Bruce R. F. Kendall, State College, PA (US)

(73) Assignee: The Fredericks Company, Huntington Valley, PA (US)

( * ) Notice: Subject to any disclaimer, the term of this patent is extended or adjusted under 35 U.S.C. 154(b) by 0 days.

(21) Appl. No.: 09/194,793
(22) PCT Filed: May 8, 1998
(86) PCT No.: PCT/US98/09024
§ 371 Date: Oct. 22, 1998
§ 102(e) Date: Oct. 22, 1998
(87) PCT Pub. No.: WO98/50768
PCT Pub. Date: Nov. 12, 1998

Related U.S. Application Data
(60) Provisional application No. 60/046,033, filed on May 9, 1997.

(51) Int. Cl.$^7$ .................................................. G01L 9/00
(52) U.S. Cl. .................................................. 73/753
(58) Field of Search .......................... 73/705, 714, 753, 73/754, 755; 324/459, 460, 461, 462, 463; 250/397, 427; 313/7, 230, 264, 363.1

(56) References Cited

U.S. PATENT DOCUMENTS

| | | | |
|---|---|---|---|
| 3,253,183 | 5/1966 | Van Oostrom | 315/108 |
| 3,320,455 | 5/1967 | Whetten et al. | 313/7 |
| 3,341,727 | 9/1967 | Schuemann | 313/7 |
| 3,378,712 | 4/1968 | Lafferty | 313/7 |
| 3,449,660 | 6/1969 | Herb | 324/33 |
| 3,509,418 | 4/1970 | Van Oostrom | 315/108 |
| 3,743,876 | 7/1973 | Redhead | 313/7 |

(List continued on next page.)

OTHER PUBLICATIONS

Redhead, P.A., "Ultrahigh Vacuum Pressure Measurements: Limiting Processes", *Journal of Vacuum Science and Technology*, vol. 5, No. 5, Nov. 1997, pp. 3215–3223.

Zheng Qing, Tang et al., "Self Cancellation Between The Normal and Reverce X–Ray Curretn in Bayard–Alpert Gauge", *Journal of Vacuum Science and Technology*, vol. 8, No. 5, 1988, pp. 305–310, (No Month).

Patent Abstracts of Japan, vol. 097, No. 007, Jul. 31, 1997 & JP 09 068473 (Ulvac Japan Ltd), Mar. 11, 1997.

(List continued on next page.)

*Primary Examiner*—William Oen
(74) *Attorney, Agent, or Firm*—Drinker Biddle & Reath LLP

(57) ABSTRACT

A Bayard-Alpert gas pressure measuring gauge with x-ray effect neutralization comprising collector and shield electrodes that comprise the same substantially inert electrically conductive substances. Said inert substance may be gold or another substance from the group consisting of platinum and rhodium, and mixtures thereof, and alloys comprising gold, platinum or rhodium; or said substance may be selected from the group consisting of the oxides of indium, chromium, vanadium and tin, mixtures thereof, and alloys comprising one of these. An electrical potential is applied to the shield that is more negative than the potential applied to the collector, said potential on the shield being in the range from about zero volts to about −50 volts when the collector is operated at a positive potential. Said negative potential with respect to the collector enhances the reverse x-ray effect for cancellation of the forward x-ray effect in the gauge. The gauge may also comprise a modified collector geometry to further enhance the reverse x-ray effect to achieve neutralization of the total x-ray effect. A method for neutralization of the x-ray effect by modulating the shield potential is also disclosed.

86 Claims, 4 Drawing Sheets

U.S. PATENT DOCUMENTS

| | | | |
|---|---|---|---|
| 3,839,655 | 10/1974 | Helgeland et al. | 313/7 |
| 4,307,323 | 12/1981 | Bills et al. | 315/111.91 |
| 5,128,617 * | 7/1992 | Bills et al. | 324/459 |
| 5,296,817 | 3/1994 | Bills et al. | 324/460 |
| 5,422,573 * | 6/1995 | Bills et al. | 324/460 |
| 6,046,456 * | 4/2000 | Bills et al. | 250/397 |

OTHER PUBLICATIONS

Hayward, Jepsen, and Redhead, "Reverse X–ray Curretns in Bayard–Alpert Ionization Gauges," Aus. Vac. Symp. Trans. 1963, pp. 228–233.

Watanabe, "New Compensation Method for X–ray Photo-emission and Application th the XHV Gauges," [Name of Journal not known] vol. 34, No. 1, 1991, pp. 25–28. This document is not in English, but includes an English abstract. An informal English translation of the entire text is also filed herewith.

Redhead, "Measurement Of Residual Currents In Ionization Gauges And Residual Gas Analyzers," J. Vac. Sci. Technol. A, vol. 10, No. 4, Jul./Aug. 1992, pp. 2665–2673.

Abbott and Looney, "Infulence Of The Filament Potential Wave Form On The Sensitivity Of Glass–Envelope Bayard–Alpert Gages," J. Vac. Sci. Technol. A 12(5), Sep./Oct. 1994, pp. 2911–2916.

* cited by examiner

BAYARD-ALPERT VACUUM GAUGE WITH NEUTRALIZATION OF X-RAY EFFECT

This application claims benefit to U.S. provisional application 60/046033 filed May 9, 1997.

FIELD OF THE INVENTION

The present invention relates to the measurement of extremely high vacuum using electronic sensing devices, particularly Bayard-Alpert type gauges. The invention relates to the neutralization of x-ray effects in such measuring devices such that the sensitivity and accuracy of the gauge is enhanced.

BACKGROUND OF THE INVENTION

One of the various devices employed for measurement of ultrahigh vacuum, that is, very low gas pressure, is the Bayard-Alpert (BA) type gauge. A BA gauge operates by releasing free electrons into the low pressure space to be measured. The electrons are accelerated and collide with gas molecules present in the space, producing positive ions in the process. The positive ions are collected by an electrically conductive sensing element, an ion collector, in which the ions create a current (the "ion current"). The positively charged ions stimulate an electron flow into the collector from the external measurement circuit. Thus, the "ion current" inside the gauge gives rise to an equal and opposite electron current flowing into the collector from outside the gauge.

The ion current, in ideal conditions, is proportional to the number of ions impinging on the ion collector. Because the number of ions is also proportional to the number of gas molecules present in the space that are ionized by the injected electrons, the ion current is actually an indicator of the quality of the vacuum. The fewer gas molecules that are present, then the fewer ions are created in collisions with the free electrons, and the lower the current is in the ion collector.

As is often the case in other fields, the measurement device can produce effects that alter or limit the quality of the measurement. That is particularly so where the pressure to be measured is ultra-low (an ultrahigh vacuum), approaching a nearly total vacuum. In the case of the BA gauge, one phenomenon that presents a measurement limit is known as the "x-ray effect," which is a result of the accelerated electrons in the gauge creating not only positive ions in collisions with the gas molecules in the gauge, but also causing x-ray emissions from metals in the gauge. The x-rays cause photoelectrons to be released from conducting surfaces in the gauge. The collector current is directly affected by the photoelectron emission. An "x-ray current" is produced in the collector.

This current induces an error into the measurement, which becomes larger in proportion to the ion current as the measured gas pressures become smaller. Ultimately, the collector current caused by the x-ray effect limits the ability of the device to measure very low gas pressures.

The x-ray current is a composite of two distinct effects. The "forward x-ray effect" is caused by electrons hitting the grid of the BA gauge, producing soft x-rays. Some of these soft x-rays strike the ion collector, causing photoelectrons to be ejected from the collector. The collector current, which is positive when caused by the collection of positive ions, is increased by this electron emission. The electron emission from the collector has a similar effect as the collection of a positive ion. This enhanced forward current is known as the "forward x-ray current."

A "reverse x-ray effect" is also at work in the gauge. The x-rays created by electrons colliding with the grid strike other elements in the gauge, such as the interior of the gauge envelope. Photoelectrons are released by those elements in some of these collisions and some of these photoelectrons may strike the ion collector. These photoelectrons tend to reduce the current caused by the collection of positive ions created in electron-gas molecule collisions. Put another way, the reverse x-ray effect causes a "reverse x-ray current" in the collector.

Thus, two currents caused by the same process combine to cause error in, and at a sufficiently low pressure, to limit the sensitivity of a BA type gauge. However, the fact that the two x-ray induced currents in the gauge cause opposite currents offers the possibility of balancing the two effects, resulting in the neutralization of the x-ray effect. The result of neutralizing the x-ray effect in a BA gauge would be improved sensitivity to extremely low gas pressures and more accurate measurements of ultrahigh vacuums.

SUMMARY OF THE INVENTION

The present invention is a Bayard-Alpert measuring gauge in which selection of the materials used for the electrode elements in the gauge, the configuration of the electrodes, and the electrical biasing of the electrodes combine to balance the forward and reverse x-ray currents and to maintain that balance for extended periods of time. The result is a BA gauge having improved accuracy and sensitivity at very low gas pressures.

A first aspect of the invention is the selection of a chemically inert conductive metal for both the collector and the shield electrodes in the BA gauge. In a preferred embodiment of the invention, gold is the chosen substance. A gold coating on the interior surface of the gauge forms the shield electrode. The collector electrode may be either formed of or coated with gold. The object is to impart the same photoelectron emission characteristics to both the shield and the collector. The emission of photoelectrons from the collector is the origin of the forward x-ray current. Imparting the same photoelectron emission characteristics to the shield by using the same substance as the collector makes the balancing of the forward and reverse x-ray effects more achievable.

Alternatively, the shield and collector may be made of (or coated with) other materials, where the same material is used for both elements. It is also a workable solution to make the shield of one substance and the collector of a different substance, provided that the substances have similar properties when exposed to electron emissions and soft x-rays.

A second aspect of the invention is the electrical biasing of the gauge electrodes to neutralize the x-ray effect. Using standard bias for the cathode, collector and grid in the preferred embodiment of the invention, the shield electrode is biased with a negative voltage potential in the range from ground potential to about −50 volts, and which has ranged in test gauges between approximately −10 to −30 volts (V). This negative bias enhances the reverse x-ray current and, in the preferred gold-coated gauges, substantially offsets the forward x-ray current, neutralizing the x-ray effect in the gauge.

In some cases a modified collector geometry may be employed to further enhance the collection of photoelectrons emitted from the shield. One such modification involves a trident collector, so-called because it has three branches. The increase in photoelectron gathering enlarges the reverse x-ray current and assists in neutralizing the total x-ray effect in the gauge.

DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE INVENTION

Figure 1:
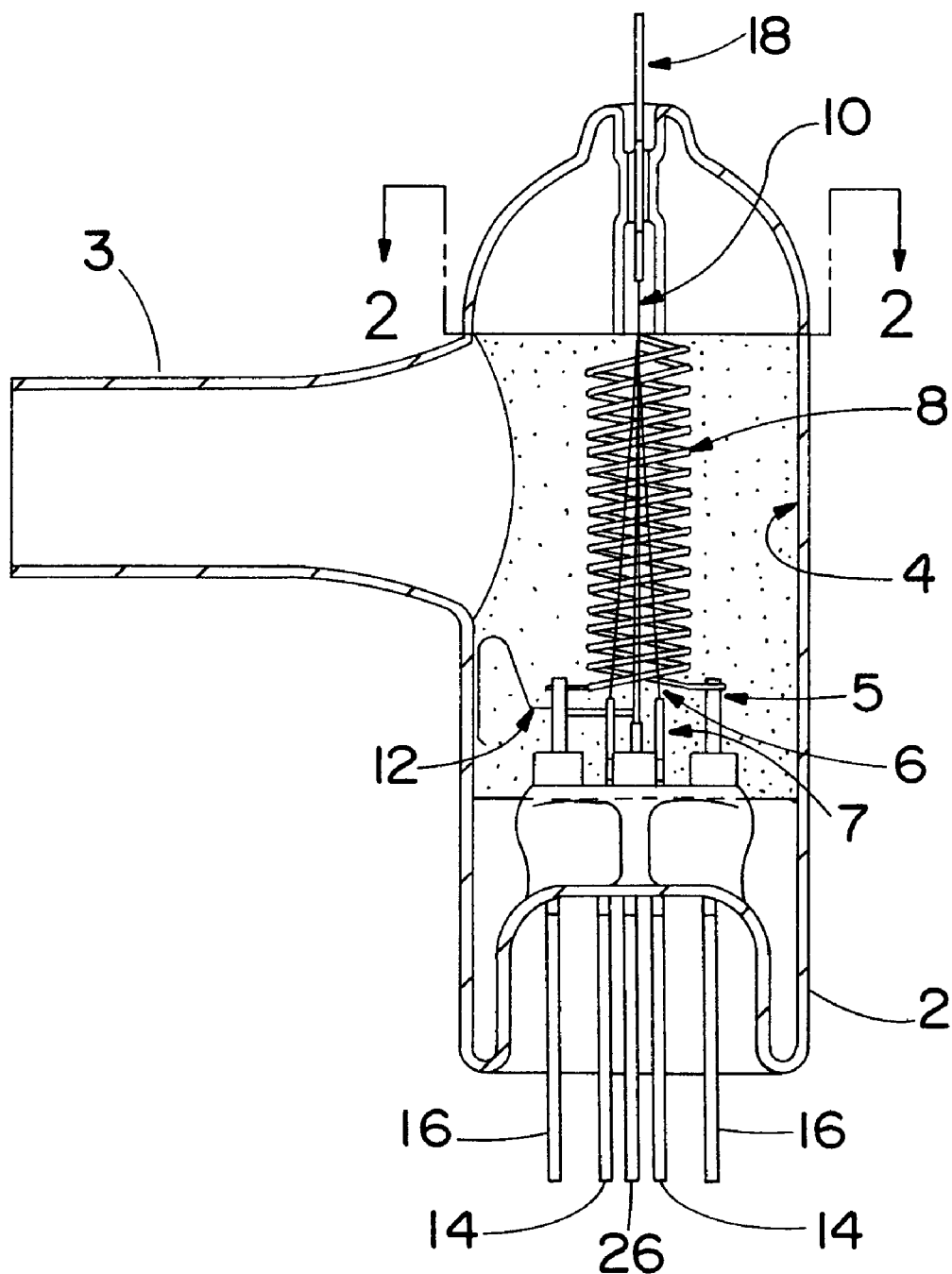
FIG. 1 is a partial section view of the Bayard-Alpert gauge of the present invention, taken along the line A—A in FIG. 2, including an elevation of the interior of the gauge.

Referring to the drawings, wherein like reference numerals indicate like elements, FIG. 1 illustrates a preferred Bayard-Alpert gauge apparatus and its elements. The body of the gauge is a closed tube 2 that is commonly made of glass. The glass tube 2 has a port 3 for insertion into a container or vessel where a low gas pressure requires measurement. The glass tube 2 is coated on the inside with a conductive material forming an equipotential shield 4.

Coating the interior surface of the tube with a conductive material is well-known in the art. However, it is important to the accurate and stable operation of the gauge of the present invention that the conductive material be a substance that is relatively inert. That is, the substance should remain, chemically and electrically, substantially unchanged during all operating conditions. It is expected that the substance will emit photoelectrons under x-ray exposure. However, the characteristics of the substance should remain constant.

One such conductive, stable and largely inert substance is gold. The shield 4 of the described embodiment is a gold coating on the inside of the glass tube 2. The shield 4 need not extend to the extreme ends of the tube 2, but may be limited to that part of the tube 2 surrounding the electrical components now to be described, as illustrated by the shaded portion of the tube 2 in FIG. 1. In addition to gold, there are other substantially inert conductive materials that may be employed as the shield 4 in the gauge of the invention, such as platinum, rhodium and the oxides of other noble metals such as indium, chromium, vanadium and tin (though not limited to these), and including glass which becomes slightly conductive when heated. In one variant of the practice of the present invention, the warm, slightly conductive glass envelope can be used as the shield, with its potential established by an external conductive coating.

Substances comprising combinations of the materials gold, platinum and rhodium, and combinations of the oxides referred to above may also be employed. Alloys of these materials with each other, such as gold-platinum alloys, and alloys of these materials with other substances may also be used, provided that the alloy is sufficiently stable and non-reactive. It is also possible to use carbon-based materials, including graphite, on the collector and shield and achieve the x-ray effect neutralization that is the principal object of the invention.

A grid 8 is supported inside the tube 2 on one or more pins 5. The grid 8 may take one of several forms. It is illustrated in FIG. 1 as a helical coil structure. It may also be a cylindrical wire mesh, or other elongated geometric shape that serves the usual purpose of the grid that is well-known to those skilled in the art. The grid 8 serves as an anode in the gauge; that is, the grid is maintained at a potential that is positive with respect to the other components. The grid may be heated in some gauges by a wire (not shown) that carries a low-voltage current for degassing purposes.

Disposed near and just outside the grid is a cathode 6, which in the described embodiment is a V-shaped element connected to pins 7 (see FIG. 2 also) at the bottom of the tube 2. In FIG. 1, the cathode 6 is outside the grid 8 and in the foreground of the illustration of the inside of the gauge. The cathode 6 is operated at a voltage strongly negative with respect to the grid 8 (though still positive with respect to the collector) and emits electrons, a few of which collide with gas molecules in the gauge. The gas molecules are ionized in the collisions. The cathode 6 need not be a V-shaped element, as it is in the described embodiment of the invention; there are other configurations that can be effective for the purpose, including coil shapes or linear electron emitters, cold emitters of various forms and beta emitters. Many of these forms are known in the art.

If a conventional thermionic emitter is used as the cathode 6, its heating current is fed through the pins 7. If a cold emitter is used, the necessary potentials are simultaneously applied through an appropriate number of pins (not shown).

Disposed within the grid is a collector 10, which is most often substantially coaxial with the longitudinal axis of the grid 8, and is so located in a preferred embodiment of the invention. The collector 10 is a fine wire element that extends into the tube 2 from the collector lead 18 at the top of the tube. The collector 10 is the measurement element in the gauge, collecting the positive ions that are produced in collisions between gas molecules and the free electrons emitted from the cathode 6. The ionized gas molecules striking the collector electrode 10 cause a current in the collector, the magnitude of which gives an indication of the gas pressure in the gauge and, thus, in the space being measured by the gauge.

A contact 12 extends from a shield pin (not shown) at the end of a shield lead 26 in the base of the tube. The contact 12 extends from the shield pin to the shield 4 coating the inside of the glass tube 2.

Figure 3:
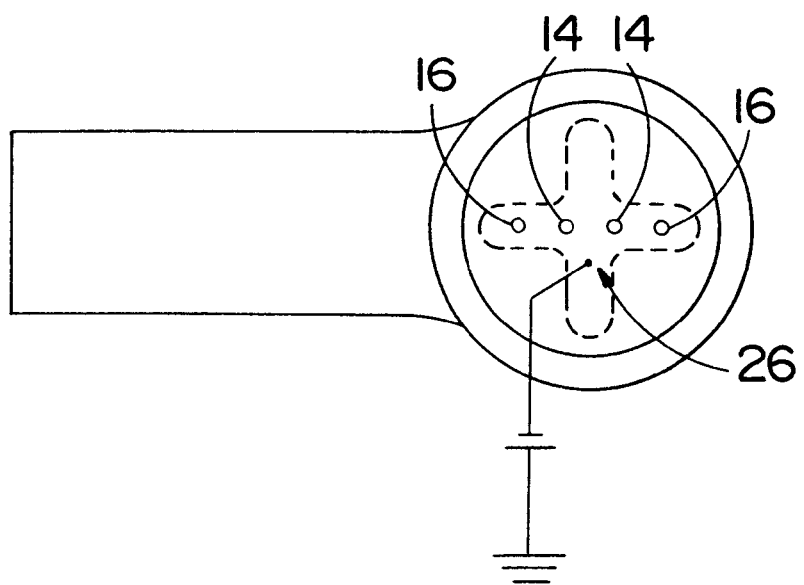
FIG. 3 is a bottom plan view of the gauge.

The electrical connections for the gauge are made at the base of the glass tube 2. The grid leads 16 provide the electrical connections to the grid 8 inside the gauge. Two cathode leads 14 provide for electrical connection to the cathode 6 inside the gauge. The positions of the grid leads 16 and cathode leads 14 are illustrated in FIG. 3 for the described embodiment of the gauge. A shield lead 26 is provided for connection to the contact 12 in the gauge that conducts a bias voltage to the shield 4.

Figure 2:
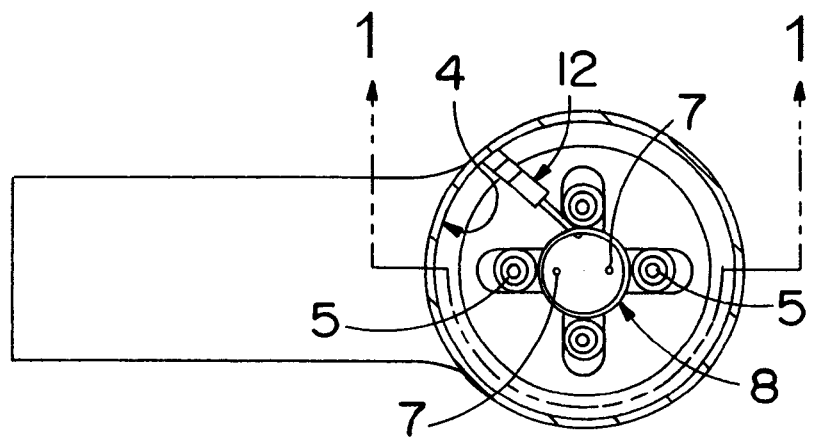
FIG. 2 is a top sectional view of the gauge taken along the line B—B in FIG. 1.

FIG. 2 illustrates the interior of the gauge in a top view, without showing the cathode and the collector. In this view, the cathode pins 7 are shown at the bottom of the tube. The contact 12 is shown extending from a pin (not shown) below the grid 8 to the shield 4 surface. The grid 8 is shown anchored to two pins 5 at the bottom of the tube.

The neutralization of the forward x-ray effect prevalent in BA gauges is achieved in the present invention by using the reverse x-ray effect to balance the forward x-ray effect. In order that this may be achieved, and that the neutralization be stable over time, the forward and reverse x-ray effects must not vary in relation to one another by an appreciable amount.

The forward x-ray effect, described above, results from x-rays impinging on the collector and causing photoelectrons to be emitted by the collector. The reverse x-ray effect is caused by x-rays striking the shield, releasing photoelectrons which travel to and strike the collector.

The forward x-ray effect tends to increase the forward current in the ion collector. When the collector current caused by ion collection becomes smaller, as in ultrahigh vacuums, the forward x-ray effect becomes more significant as an error in the pressure measurement. Eventually, at very low pressures, the forward x-ray effect becomes a limit on the ability of the gauge to make any meaningful pressure measurement.

The reverse x-ray effect acts in opposition to the forward x-ray effect. Uncontrolled, the reverse x-ray effect is also an error factor in the gauge, though in the opposite direction to the forward effect. Together, the forward and reverse x-ray effects combine to establish an "x-ray limit" on the sensitivity and accuracy of the BA gauge.

In the present invention, a way has been found to use the reverse x-ray effect to cancel the forward x-ray effect. The x-ray limit of the resulting BA gauge is therefore greatly reduced and the useful range of the gauge is extended. It is also an important aspect of the invention that the neutralization of the x-ray effect may be maintained over time; that is, a stable neutralization of the x-ray effect can be achieved with the present invention. Thus, the present invention not only enables measurement of lower pressures than with previous Bayard-Alpert type gauges, the invention also enables more accurate, stable and repeatable measurement.

An important aspect of the invention is the use of the same conductive material on two critical parts of the gauge, the shield 4 and the collector 10. Gold has proved to be an excellent substance for the shield and collector in the present invention. Gold is both relatively inert and stable. It has a relatively (compared to other metals) low photoelectron yield under exposure to x-rays. It is well known that the forward x-ray effect is produced by the ejection of electrons from the collector 10 under x-ray exposure. The reverse x-ray effect is caused by photoelectrons, produced by x-ray exposure of other gauge parts, striking the collector. The largest of these parts emitting photoelectrons is the shield 4 on the inside surface of the gauge.

Coating both the glass tube 2 of the gauge and the collector 10 with gold accomplishes a first step in balancing the forward and reverse x-ray effects. There is a certain quantity of soft x-rays produced within the BA gauge when it is operating. It is beneficial to the desired balancing of the forward and reverse x-ray effects to provide the two principal elements affected by the x-rays with a coating of an identical material. In this manner, the x-rays present in the gauge cause photoelectron activity at the two sites that lead to similar but opposite currents at the collector.

Also important, the identical material at the two sites ensures that the rate of photoelectron production will be uniform over time, in accordance with the like characteristics of the substance used to coat both the collector and shield. Though photoelectron production at the shield and collector may undergo variations in efficiency during operation, the variations will be substantially the same with a coating of identical material on both electrodes.

For these reasons, gold is not the only substance that may be contemplated for use in the collector and shield elements. Other substances such as platinum, rhodium, or oxides other noble metals, such as indium, vanadium, chromium and tin, are adaptable to the application and may be used in a gauge constructed in accordance with the invention and its objects. Non-alloyed combinations of stable materials like those listed and alloys made from them may also accomplish the object of the invention. Each substance is a conductor of electrons. Because the noble metals are generally chemically non-reactive, these substances can be expected not to exhibit gross changes in their physical or electrical characteristics relating to photoelectron emission in the presence of soft x-rays over the lifetime of a gauge. The bias voltage on the shield may be different than in a gold gauge, but the voltage required to achieve the best compensation of the x-ray effect is still a negative voltage (with respect to the collector) applied to the shield.

It is also possible to use different substances for the collector and shield within a gauge and still obtain similar x-ray effect cancellation. It would be important for the two substances to exhibit similar photoelectron emission properties in response to exposure to soft x-rays. This characteristic would permit the balancing and cancellation of the forward and reverse x-ray effects in substantially the same manner as in the described embodiment of the invention. The substances would also have to be stable over time and not differ greatly in the rate of change of chemical and electrical properties over the useful lifetime of a gauge constructed with them. The substances presently known to provide the stability and similarity in photoelectron emission properties required are those listed previously for use on the shield and collector.

An additional advantage of gold-coated gauge envelopes is the ease of degassing them by electron-stimulated desorption, as distinct from electron-bombardment heating. The inside of the envelope can be degassed by collecting on the shield a few milliamperes of electron current. To achieve this, the shield may be biased temporarily with a sufficient positive potential, relative to the cathode, so that a small current of electrons flows from the cathode to the shield. This method accomplishes desorption without getting the gold film hot enough to evaporate. The electron-stimulated desorption degassing of the shield may be operated simultaneously with conventional electron bombardment or joule degassing of the other gauge electrodes. The same shield degassing technique may be applied to other gauges having a separate internal shield that does not coat the tube envelope.

Another important aspect of the invention is controlling the x-ray effect neutralization by using a calibrated negative bias voltage on the shield. It has been determined experimentally that biasing the gold shield negatively with respect to the gold collector achieves balance between the forward and reverse x-ray effects. The negative potential on the shield enhances the reverse x-ray effect to a magnitude that equals the forward x-ray effect. Higher potentials on the shield lead to positive errors in pressure readings from the gauge, an indication that the forward x-ray effect is predominant over the reverse x-ray effect. With the shield biased to an appropriate negative potential (normally in the range of about −10 to −30 V determined experimentally for test gauges), the total x-ray effect is rendered virtually undetectable.

For operation according to the invention, the glass tube BA gauge is connected to DC power sources to apply bias voltages to the electrodes (that is, the grid, the cathode, the shield, and the collector) in the gauge. In the presently preferred embodiment of the gauge (gold shield and collector), operating voltages applied to the electrodes are:

| | |
|---|---|
| collector (gold coated) | ground |
| grid | +180 to 200 V |
| cathode | +30 V |
| shield (gold) | negative (test results range from −10 to −30 V) |

Referring to FIG. 1, these operating voltages are applied at the collector lead 18, the grid leads 16, the cathode leads 14, and the shield lead 26 respectively. It is important to note that the description of the gold gauge presented up to this point is for a gauge operated with the collector at ground potential (as shown above). It is possible to operate the collector at a positive potential, as described further below, within the scope of the invention to achieve x-ray effect cancellation.

The optimum potential for the shield has been determined experimentally and can vary according to the geometry of a particular BA gauge, the exact configuration of the electrodes, and, of course, the material used to coat the collector and the shield according to the present invention. One skilled in the art can determine the optimum x-ray effect neutralization shield bias in a BA gauge of similar design by performing a reasonably routine calibration. An example process for determining the optimum x-ray effect neutralization bias for the gold shield of the present invention is described below.

It is also possible to offset the operating voltages toward the positive so that the glass gauge may operate with the shield at ground potential and still achieve x-ray effect cancellation. The object remains to operate the shield at a voltage range from about 10 to 30 volts negative with respect to the collector. Thus, the collector may be operated at a bias of +24 Vdc, for instance, with the shield grounded (that is, the shield is 24 volts more negative than the collector). It is likely that positive adjustments to the operating bias of the cathode and grid would also be necessary to operate correctly in this mode, however it would be important to maintain the cathode more positive than the collector to prevent direct collection of electrons by the collector.

The output reading of the BA gauge made according to the present invention is adjusted so that its readings agree with a calibrated standard pressure gauge, such as an Extractor gauge (or other reliably accurate vacuum gauge) at pressures in the $10^{-8}$ Torr range, by setting the electron current emitted from the cathode to a suitable level. Then, the test pressure is reduced to the low $10^{-10}$ to $10^{-12}$ Torr range, where x-ray effects become noticeable. The next step is to adjust the potential on the shield to cancel the x-ray effect. The gold coating of the BA gauge shield is set to a potential that gives the same indicated pressure from the BA gauge as the calibrated standard gauge reading. Because adjusting the shield potential has a slight effect on the gauge sensitivity, this calibration cycle may be repeated for maximum accuracy. In two experimental embodiments of the gold gauge version of the invention described herein, the x-ray effect neutralization potentials on the gold shield were −13 V and −15 V respectively.

Using the above method, or one that achieves substantially the same calibration, together with the identical coating on the shield and collector of the BA gauge as described, those skilled in the art can construct and operate a BA gauge in which the x-ray limit can be substantially eliminated. Individual gauges may require somewhat different bias voltages to maintain the best x-ray effect neutralization. For mass production of many such BA gauges, a uniform shield bias setting may be used that is based on the average potential needed for a suitable statistical sample of similar gauges.

It is possible to reduce the total x-ray effect in a gauge according to the invention by treating the exposed surfaces of the electrodes and shield with carbon, or another suitable material having a low atomic number (a "low-Z" material). The lower x-ray emissions from treated surfaces can significantly reduce the total x-ray effect in the gauge. This reduced total x-ray effect can make neutralization easier to achieve. However, test gauges have been successfully neutralized without the use of low-Z materials.

Another aspect of the present invention is alteration of the geometry of the collector electrode, referred to here as the "modified collector approach." Neutralization of the total x-ray effect in a BA gauge typically requires enhancing the reverse x-ray effect to balance the forward x-ray effect. This enhancement can be achieved by increasing the size of the collector and locating part of the collector closer to the shield. In this way, more of the photoelectrons emitted from the shield collide with the collector, increasing the reverse x-ray current in the collector.

Figure 4:
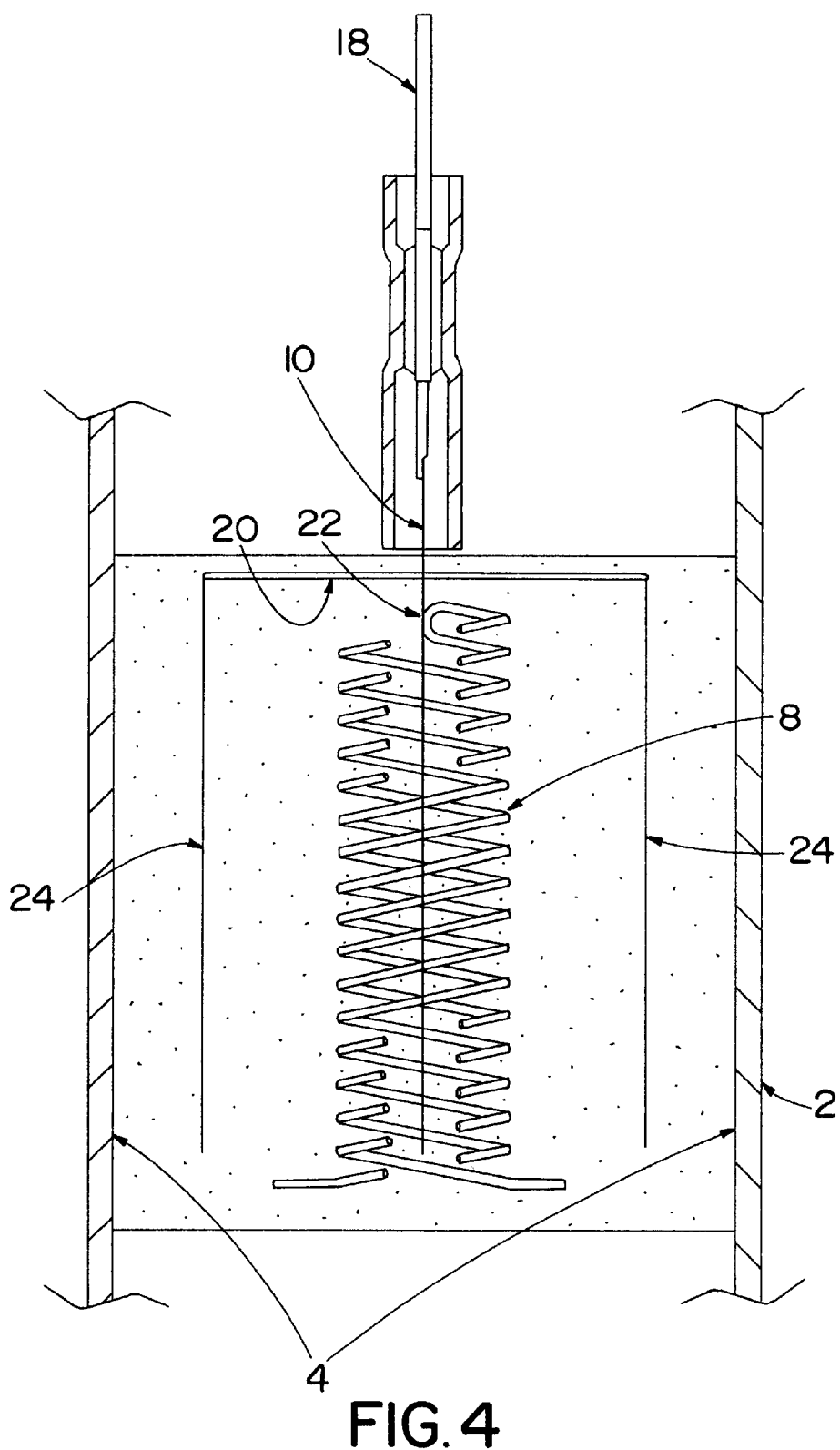
FIG. 4 is a partial section view of the interior of the gauge showing the arrangement of the grid and a trident collector electrode.

FIG. 4 illustrates an example of the modified collector approach, referred to herein as the "trident collector." The collector 10 enters the tube 2 from the collector lead 18. The collector then branches into three elements: a primary wire 22, and two secondary wires 24 extending into the body of the gauge from a collector cross-bar 20. In this embodiment of the invention, the collector leads and cross-bar are coated with gold, or another suitable material, as is the shield 4. The secondary wires 24 of the trident collector gather more photoelectrons emanating from the shield than the single-wire collector within the grid. The reverse x-ray current is thus enhanced, resulting in an increased opportunity to cancel the forward x-ray effect and, thus, to neutralize the overall x-ray effect in the gauge, lowering the x-ray limit.

There are many other specific geometries that are possible for enhancing the collector's ability to gather shield-emitted photoelectrons. Each of the possible alternative geometries would be equivalent to the function of the trident collector described, the way the trident collector operates to gather more photoelectrons, and the result realized from its employment. What alternative embodiments to the preferred trident collector would have in common is the addition of secondary collector elements outside the grid volume, where the collection of photoelectrons from the shield is greater than within the grid. Using the trident collector, or an equivalent, in combination with a gold-coated shield and collector, neutralization of the x-ray effect may be even more reliably achieved.

Though the embodiment of the present invention described herein is a glass Bayard-Alpert type gauge, the invention is also applicable to "nude" Bayard-Alpert gauges, metal envelope Bayard-Alpert gauges, and to certain other types of hot-cathode ion gauges. Applying the present invention to these gauge types, a conductive shield must be present and an appropriate potential difference established between the shield and the ion collector. The metal envelope (of a metal envelope gauge), or the grounded housing of a nude gauge, serves as the shield. But no potential is applied to the metal envelope (or housing).

Where a glass gauge has a grounded internal shield, or if a metal envelope is grounded, there is typically only a partial cancellation of the forward x-ray effect by a smaller reverse effect. The electrons from the grounded shield or envelope have barely enough energy to get to the grounded collector.

Most are picked up by the grid, which is strongly positive. This condition is typical in mass production nude and metal envelope gauges.

In such gauges, x-ray effect neutralization can be controlled by offsetting the ion collector potential positively from ground. In this manner, the housing becomes the shield and the voltage offset is applied to the gauge electrodes instead of to the housing. The potentials of the elements of the gauge are adjusted to mimic the condition where a shield is operated at a negative potential. In these devices, the envelope or housing is simply grounded. The electrical voltages of the other elements, cathode, grid and collector, are set such that the gauge operates correctly and the grounded housing or envelope has a potential more negative than the collector. This requires that the collector be operated at a positive bias ranging from a few volts up to about +30 Vdc.

Comparison to the preferred embodiment is instructive. In the gold-coated glass gauge, the collector is at ground potential and the shield may be set at about −15 V, a differential of plus 15 volts for the collector offset. In the metal-envelope gauge, the collector is similarly offset to the positive with respect to the grounded envelope (or housing). The differential may be different than the 15 volts in the glass tube, but a reduction in the x-ray limit may be achieved as in the glass BA gauge. Electrically, the positive collector voltage offset in the metal-envelope gauge creates the same conditions that are described above for the glass BA gauge.

In order to more closely replicate the invention in a nude or metal envelope gauge, attention should be given to making the housing (envelope) and collector metals the same, or at least of similar properties, as in the glass gauge embodiment of the invention described herein. There are several metallurgical means by which persons skilled in the art may accomplish this end, including evaporating or plating an appropriate metal film on the interior of the housing or metal envelope to match the properties of the collector.

In glass gauges without a shield, or with a shield connected to the cathode, the interior of the gauge envelope usually goes to cathode potential of +30 V or so. Photoelectrons from the interior of the envelope cannot reach the collector against the strong positive potential gradient, so there is little or no reverse x-ray current. This is typical of production glass gauges now in use.

If the positive potential offset of the collector is not sufficient to neutralize the x-ray effect in the metal-envelope or nude gauge, the modified collector approach can improve the x-ray limit. A trident collector, or equivalent structure, will increase the reverse x-ray current, further offsetting the forward x-ray effect and lowering the x-ray limit of the gauge.

In each of the described gauge variations (glass envelope, nude, metal envelope), the shield may be suspended or supported within the gauge instead of being a conductive material coating on the envelope or housing. The fact that the shield is not applied to the envelope or housing, but is instead suspended independently within the gauge, does not place a gauge so constructed outside the scope of the present invention. Neutralization of the x-ray effect in the gauge can be achieved by operating the gauge with an independently constructed shield in the same manner as described herein for any gauge where the shield is a coating on the glass envelope or other housing.

Another aspect of the present invention is a method of calibrating and using a glass BA gauge to obtain accurate measurements even where the x-ray effect cannot be entirely neutralized by electronic means. The bias voltage on the shield can be modulated between two or more values and the effect on the measured pressure noted. Together with the knowledge of how much x-ray effect is present in the gauge, the modulation data may be used in a calibration that is employed to compensate the measured values for the x-ray effect. This method is useful for any gauge in which the x-ray effect cannot be effectively neutralized because of limiting factors that can not be eliminated, such as collector geometry, metal characteristic differences (different photo-electron response to x-rays) and the like.

The "modulation technique" involves a calibration of the x-ray error in the gauge at different shield potentials. Pressure readings are taken at two distinct potentials on the shield where the reverse x-ray effect can be observed to change. The difference in pressure readings is directly related to the change in the reverse x-ray current when the shield potential is changed. The change in reverse x-ray current affects the total x-ray effect in the gauge. Once it has been determined that the x-ray effect changes by a known fraction of its total value, it is possible to calculate the true pressure by extrapolating the total x-ray effect and correcting for it.

In the following relations, signal "H" represents the gauge output with the gold shield at cathode potential. There is then no reverse x-ray effect, and "H" therefore represents the sum of true pressure P and the forward x-ray effect F.

$$H = P + F \quad (1)$$

When the gold shield is switched to a more negative potential such that a fraction f of the forward x-ray effect is cancelled, the output signal L is obtained.

$$L = H - fF \quad (2)$$

Solving for P:

$$P = H - (H-L)/f \quad (3)$$

Thus, once a known cancellation factor (1/f) is experimentally determined, the pressure readings are susceptible to a mathematical calculation of the total x-ray effect and automated correction based on the known relation. A stepped modulation of the shield potential, varying the reverse x-ray effect and resultant partial cancellation of the forward x-ray effect, can yield the cancellation factor.

A calibration of the gauge, using a technique similar to that described above for the gold BA gauge, can determine the total x-ray effect present in the gauge. To employ the modulation technique to compensate for the x-ray effect, it must be determined how much of this total can be neutralized by modulating the shield potential. In other words, the cancellation factor must be determined.

For example, a calibration may reveal that half of the x-ray error is neutralized by switching the shield potential from a higher to a lower value (e.g., from +30 V to ground). It may be observed that the pressure reading is reduced by, say, $2 \times 10^{-10}$ Torr when switching the shield potential.

Knowing that the indicated change when the shield is modulated represents half of the x-ray error, it may be presumed that the remaining half of the x-ray effect is another $2 \times 10^{-10}$ Torr. Thus, the true pressure reading is $4 \times 10^-$Torr below the pressure reading obtained with the shield at the higher potential.

It is therefore possible to correct for the x-ray induced error in the pressure readings without actually neutralizing the x-ray effect in the gauge. Modulation of the shield potential to reduce the x-ray error by a known fraction provides the information needed to calibrate out the x-ray error in the gauge. The shield potential modulation may be done continuously to maintain the most accurate calibration of how much x-ray effect variance results, and therefore how much total correction must be applied to the measured pressure reading to correct for the x-ray induced error. The shield modulation process may be automated under computer control.

The shield modulation technique modulates the reverse x-ray effect in the gauge. Changing the shield potential changes the efficiency of transfer of photoelectrons from the shield to the collector, enabling more photoelectrons to reach the collector when the shield potential is made less positive with respect to the grid and collector. In this manner, shield modulation varies the total x-ray effect in the gauge.

Figure 5:
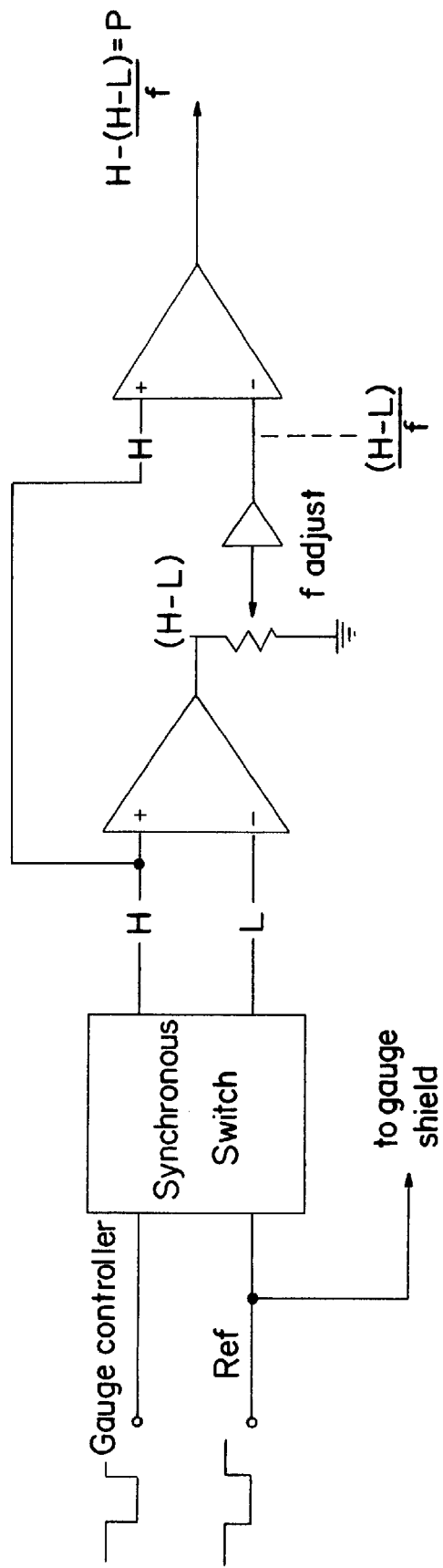
FIG. 5 is a schematic diagram of an automated gauge modulator control.

As an example of automated control of the correction factor based on the modulation technique, the circuit shown in FIG. 5 was employed to process the input signals H and L (Equations 1–3 above) with the aid of a gold shield reference signal R, as shown. This circuit automatically calculates the true pressure P, corrected for x-ray effect, provided the gain adjustment 1/f is made during calibration against a gauge of known accuracy (such as an Extractor gauge). Similar results are obtained even if the signal H is itself partly neutralized.

In a test, the reference signal applied to the gold shield was switched from ground to −20 Vdc at 0.2 Hz. Setting the gain control to match the Extractor gauge output reading at any low pressure gave a good match to the Extractor gauge measurement at all pressures. Repeating this calibration process with a 10 V square wave on the gold shield gave similar results, though slightly more accurate data were obtained with the higher voltage. This demonstrates that the modulation method can yield reasonably accurate results, corrected for x-ray effect, even where the calibration is performed at different fractions of partial x-ray effect cancellation.

The present invention may be embodied in other specific forms without departing from the spirit or essential attributes thereof and, accordingly, reference should be made to the appended claims, rather than to the foregoing specification, as indicating the scope of the invention.

We claim:

1. A Bayard-Alpert type gas pressure measuring gauge providing neutralization of the total x-ray effect in the measurement result by balancing the forward x-ray effect and the reverse x-ray effect, said gauge comprising:

a glass enclosure containing a plurality of electrodes, said glass enclosure having a conductive coating on at least a portion of its interior surface forming an equipotential shield on the glass enclosure, said shield having a connection to an electrical lead by which electrical potential may be applied to the shield from outside the gauge;

said glass enclosure having a port for communication with a space in which gas pressure is to be measured;

said plurality of electrodes comprising a grid, a cathode and a collector, each of said electrodes having a connection to a respective electrical lead by which electrical potential may be applied individually to each of said electrodes from outside the gauge;

said shield and said collector each comprising the same substantially inert conductive substance on their respective exposed surfaces within the gauge.

2. The gauge of claim 1, wherein:

said inert conductive substance on the shield and collector is a material selected from the group consisting of gold, platinum, rhodium, mixtures thereof, and alloys comprising gold, platinum, or rhodium.

3. The gauge of claim 1, wherein:

said inert conductive substance on the shield and collector is a material selected from the group consisting of the oxides of indium, chromium, vanadium, tin, mixtures thereof, and alloys comprising the oxides of indium, chromium, vanadium, or tin.

4. The gauge of claim 1, wherein:

the shield is operated at a negative potential with respect to the collector potential for enhancing the reverse x-ray effect.

5. The gauge of claim 3, wherein:

the operating shield potential is within the range from about zero volts to about −50 volts.

6. The gauge of claim 3, wherein:

the grid is operated at an applied electrical potential of about +190 volts;

the cathode is operated at an applied potential of about +30 volts; and the collector is operated at about ground potential.

7. The gauge of claim 1, wherein:

the collector electrode takes a geometric form that is non-linear, at least one portion of which is disposed between the grid and the glass enclosure for gathering photoelectrons that do not penetrate the grid.

8. The gauge of claim 7, wherein:

the collector is formed from at least two elongated wires, a first wire being disposed within the grid, and the second wire being disposed between the grid and the glass enclosure.

9. The gauge of claim 7, wherein:

the collector comprises three wires projecting from a crossbar in the gauge, at least one of said three wires being disposed between the grid and the shield.

10. The gauge of claim 1, further comprising:

a carbon-based material on at least one or more of the electrodes.

11. A Bayard-Alpert type gas pressure measuring gauge providing neutralization of the total x-ray effect in the measurement result by balancing the forward x-ray effect and the reverse x-ray effect, said gauge comprising:

a glass enclosure containing a plurality of electrodes, said glass enclosure having a conductive coating on at least a portion of its interior surface forming an equipotential shield on the glass enclosure, said shield having a connection to an electrical lead by which electrical potential may be applied to the shield from outside the gauge;

said glass enclosure having a port for communication with a space in which gas pressure is to be measured;

said plurality of electrodes comprising a grid, a cathode and a collector, each of said electrodes having a connection to a respective electrical lead by which electrical potential may be applied individually to each of said electrodes from outside the gauge;

said shield and said collector each comprising different substantially inert conductive substances on their respective exposed surfaces within the gauge, with each of said inert conductive substances having similar chemical and electrical characteristics and similar responses to changing physical and electrical environments.

12. The gauge of claim 11, wherein:

said inert conductive substance on one of the shield or collector is a material selected from the group consisting of gold, platinum, and rhodium, mixtures of these, and alloys comprising gold, platinum or rhodium, said inert conductive substance on the other of the shield or collector is a different material selected from the group consisting of gold, platinum, and rhodium, mixtures of these, and alloys comprising gold, platinum or rhodium, than that employed on the first one of the shield or collector.

13. The gauge of claim 11, wherein:

the shield is operated at a negative potential with respect to the collector for enhancing the reverse x-ray effect.

14. The gauge of claim 13, wherein:

the shield potential is within the range from about zero volts to about −50 volts.

15. The gauge of claim 14, wherein:

the grid is operated at an applied electrical potential of about +190 volts;

the cathode is operated at an applied potential of about +30 volts; and the collector is operated at about ground potential.

16. The gauge of claim 11, wherein:

the collector electrode takes a geometric form that is non-linear, at least one portion of which is disposed between the grid and the glass enclosure for gathering photoelectrons that do not penetrate the grid.

17. The gauge of claim 16, wherein:

the collector is formed from at least two elongated wires, a first wire being disposed within the grid, and the second wire being disposed between the grid and the glass enclosure.

18. The gauge of claim 11, wherein:

the collector comprises three wires projecting from a crossbar in the gauge, at least one of said three wires being disposed between the grid and the shield.

19. The gauge of claim 11, further comprising:

a carbon-based material on at least one or more of the electrodes.

20. A Bayard-Alpert type gas pressure measuring gauge providing neutralization of the total x-ray effect in the measurement result by balancing the forward x-ray effect and the reverse x-ray effect, said gauge comprising:

a glass enclosure containing a plurality of electrodes, said glass enclosure having a port for communication with a space in which gas pressure is to be measured;

said plurality of electrodes comprising a grid, a cathode, a collector and a shield, each of said electrodes having a connection to a respective electrical lead by which electrical potential may be applied individually to each of said electrodes from outside the gauge, said shield and said collector each comprising the same substantially inert conductive substance on their respective exposed surfaces within the gauge.

21. The gauge of claim 20, said shield having an applied negative electrical potential with respect to the collector potential for balancing the x-ray effect in the gauge.

22. The gauge of claim 21, wherein:

the applied shield potential is within the range from about zero volts to about −50 volts.

23. The gauge of claim 20, wherein:

said inert conductive substance on the shield and collector is a material selected from the group consisting of gold, platinum, rhodium, mixtures thereof, and alloys comprising gold, platinum, or rhodium.

24. The gauge of claim 20, wherein:

said inert conductive substance on the shield and collector is a material selected from the group consisting of the oxides of indium, chromium, vanadium, tin, mixtures thereof, and alloys comprising the oxides of indium, chromium, vanadium, or tin.

25. The gauge of claim 22, wherein:

the grid is operated at an applied electrical potential of about +190 volts;

the cathode is operated at an applied potential of about +30 volts; and the collector is operated at about ground potential.

26. The gauge of claim 20, wherein:

the collector electrode takes a geometric form that is non-linear, at least one portion of which is disposed between the grid and the glass enclosure for gathering photoelectrons that do not penetrate the grid.

27. The gauge of claim 20, wherein:

the collector is formed from at least two elongated wires, a first wire being disposed within the grid, and the second wire being disposed between the grid and the glass enclosure.

28. A Bayard-Alpert type gas pressure measuring gauge providing neutralization of the total x-ray effect in the measurement result by balancing the forward x-ray effect and the reverse x-ray effect, said gauge comprising:

a glass enclosure containing a plurality of electrodes, said glass enclosure having a conductive coating on at least a portion of its interior surface forming an equipotential shield on the glass enclosure, said shield having a connection to an electrical lead by which electrical potential may be applied to the shield from outside the gauge;

said glass enclosure having a port for communication with a space in which gas pressure is to be measured;

said plurality of electrodes comprising a grid, a cathode and a collector, each of said electrodes having a connection to a respective electrical lead by which electrical potential may be applied individually to each of said electrodes from outside the gauge;

said shield and said collector each comprising the same substantially inert conductive substance on their respective exposed surfaces within the gauge;

said shield having an applied negative electrical potential with respect to the collector potential for balancing the x-ray effect in the gauge; and the collector electrode takes a geometric form that is non-linear, at least one portion of which is disposed between the grid and the glass enclosure for gathering photoelectrons that do not penetrate the grid.

29. The gauge of claim 28, wherein:

said inert conductive substance on the shield and collector is a material selected from the group consisting of gold, platinum, rhodium, mixtures thereof, and alloys comprising gold, platinum, or rhodium.

30. The gauge of claim 28, wherein:

said inert conductive substance on the shield and collector is a material selected from the group consisting of the oxides of indium, chromium, vanadium, tin, mixtures thereof, and alloys comprising the oxides of indium, chromium, vanadium, or tin.

31. The gauge of claim 28, wherein:

the shield potential is within the range from about zero volts to about −50 volts.

32. The gauge of claim 31, wherein:
the grid is operated at an applied electrical potential of about +190 volts;
the cathode is operated at an applied potential of about +30 volts; and
the collector is operated at about ground potential.

33. The gauge of claim 28, wherein:
the collector is formed from at least two elongated wires, a first wire being disposed within the grid, and the second wire being disposed between the grid and the glass enclosure.

34. A Bayard-Alpert type gas pressure measuring gauge providing neutralization of the total x-ray effect in the measurement result by balancing the forward x-ray effect and the reverse x-ray effect, said gauge comprising:
a glass enclosure containing a plurality of electrodes, said glass enclosure having a port for communication with a space in which gas pressure is to be measured;
said plurality of electrodes comprising a grid, a cathode, a collector and a shield, each of said electrodes having a connection to a respective electrical lead by which electrical potential may be applied individually to each of said electrodes from outside the gauge;
said shield and said collector each comprising different substantially inert conductive substances on their respective exposed surfaces within the gauge, with each of said inert conductive substances having similar chemical and electrical characteristics and similar responses to changing physical and electrical environments.

35. The gauge of claim 34, said shield having an applied negative electrical potential for balancing the x-ray effect in the gauge.

36. The gauge of claim 34, wherein:
said inert conductive substance on one of the shield or collector is a material selected from the group consisting of gold, platinum, and rhodium, mixtures of these, and alloys comprising gold, platinum or rhodium,
said inert conductive substance on the other of the shield or collector is a different material selected from the group consisting of gold, platinum, and rhodium, mixtures of these, and alloys comprising gold, platinum or rhodium, than that employed on the first one of the shield or collector.

37. The gauge of claim 34, wherein:
the applied shield potential is within the range from about zero volts to about −50 volts.

38. The gauge of claim 37, wherein:
the grid is operated at an applied electrical potential of about +190 volts;
the cathode is operated at an applied potential of about +30 volts; and
the collector is operated at about ground potential.

39. The gauge of claim 34, wherein:
the collector electrode takes a geometric form that is non-linear, at least one portion of which is disposed between the grid and the glass enclosure for gathering photoelectrons that do not penetrate the grid.

40. The gauge of claim 34, wherein:
the collector is formed from at least two elongated wires, a first wire being disposed within the grid, and the second wire being disposed between the grid and the glass enclosure.

41. A Bayard-Alpert type gas pressure measuring gauge providing neutralization of the total x-ray effect in the measurement result by balancing the forward x-ray effect and the reverse x-ray effect, said gauge comprising:
a glass enclosure containing a plurality of electrodes, said glass enclosure having a conductive coating on at least a portion of its interior surface forming an equipotential shield on the glass enclosure, said shield having a connection to an electrical lead by which electrical potential may be applied to the shield from outside the gauge;
said glass enclosure having a port for communication with a space in which gas pressure is to be measured;
said plurality of electrodes comprising a grid, a cathode and a collector, each of said electrodes having a connection to a respective electrical lead by which electrical potential may be applied individually to each of said electrodes from outside the gauge;
said shield and said collector each comprising different substantially inert conductive substances on their respective exposed surfaces within the gauge, with each of said inert conductive substances having similar chemical and electrical characteristics and similar responses to changing physical and electrical environments; and
said shield having an applied negative electrical potential for balancing the x-ray effect in the gauge; and
the collector electrode takes a geometric form that is non-linear, at least one portion of which is disposed between the grid and the glass enclosure for gathering photoelectrons that do not penetrate the grid.

42. The gauge of claim 41, wherein:
said inert conductive substance on one of the shield or collector is a material selected from the group consisting of gold, platinum, and rhodium, mixtures of these, and alloys comprising gold, platinum or rhodium,
said inert conductive substance on the other of the shield or collector is a different material selected from the group consisting of gold, platinum, and rhodium, mixtures of these, and alloys comprising gold, platinum or rhodium, than that employed on the first one of the shield or collector.

43. The gauge of claim 41, wherein:
the applied shield potential is within the range from about zero volts to about −50 volts.

44. The gauge of claim 43, wherein:
the grid is operated at an applied electrical potential of about +190 volts;
the cathode is operated at an applied potential of about +30 volts; and
the collector is operated at about ground potential.

45. The gauge of claim 41, wherein:
the collector is formed from at least two elongated wires, a first wire being disposed within the grid, and the second wire being disposed between the grid and the glass enclosure.

46. A Bayard-Alpert type gas pressure measuring gauge providing neutralization of the total x-ray effect in the measurement result by balancing the forward x-ray effect and the reverse x-ray effect, said gauge comprising:
a plurality of electrodes within a housing, said electrodes comprising a grid anode, a cathode, and a collector, each of said electrodes having a connection to a respective electrical lead by which electrical potential may be applied individually to each of said electrodes from outside the gauge;
said housing having a surface in facing proximity to said electrodes;

said facing surface of said housing and said collector having the same substantially inert conductive substance on their respective surfaces within the gauge.

47. The gauge of claim 46, wherein:
said inert conductive substance on the shield and collector is a material selected from the group consisting of gold, platinum, rhodium, mixtures thereof, and alloys comprising gold, platinum, or rhodium.

48. The gauge of claim 46, wherein:
said inert conductive substance on the shield and collector is a material selected from the group consisting of the oxides of indium, chromium, vanadium, tin, mixtures thereof, and alloys comprising the oxides of indium, chromium, vanadium, or tins.

49. The gauge of claim 46, wherein:
the conductive substance on the housing is biased at a negative potential with respect to the collector for enhancing the reverse x-ray effect.

50. The gauge of claim 46, wherein:
the housing conductive substance electrical potential is within the range from about zero volts to about −50 volts.

51. The gauge of claim 50, wherein:
the grid is operated at an applied electrical potential of about +190 volts;
the cathode is operated at an applied potential of about +30 volts; and
the collector is operated at about ground potential.

52. The gauge of claim 46, wherein:
the collector electrode takes a geometric form that is non-linear, at least one portion of which is disposed between the grid and the housing for gathering photoelectrons that do not penetrate the grid.

53. The gauge of claim 46, wherein:
the collector is formed from at least two elongated wires, a first wire, being disposed within the grid, and the second wire being disposed between the grid and the housing.

54. A Bayard-Alpert type gas pressure measuring gauge providing neutralization of the total x-ray effect in the measurement result by balancing the forward x-ray effect and the reverse x-ray effect, said gauge comprising:
a plurality of electrodes within a housing, said electrodes comprising a grid anode, a cathode, a collector and a shield, each of said electrodes having a connection to a respective electrical lead by which electrical potential may be applied individually to each of said electrodes from outside the gauge;
said shield and said collector having the same substantially inert conductive substance on their respective surfaces within the gauge.

55. The gauge of claim 54, wherein:
said inert conductive substance on the shield and collector is a material selected from the group consisting of gold, platinum, rhodium, mixtures thereof, and alloys comprising gold, platinum, or rhodium.

56. The gauge of claim 54, wherein:
said inert conductive substance on the shield and collector is a material selected from the group consisting of the oxides of indium, chromium, vanadium, tin, mixtures thereof, and alloys comprising the oxides of indium, chromium, vanadium, or tin.

57. A Bayard-Alpert type gas pressure measuring gauge providing neutralization of the total x-ray effect in the measurement result by balancing the forward x-ray effect and the reverse x-ray effect, said gauge comprising:
a plurality of electrodes within a housing, said electrodes comprising a grid anode, a cathode, a collector, each of said electrodes having a connection to a respective electrical lead by which electrical potential may be applied individually to each of said electrodes from outside the gauge;
said housing having a surface in facing proximity to said electrodes;
said facing surface of the housing and said collector each comprising different substantially inert conductive substances on their respective exposed surfaces within the gauge, with each of said inert conductive substances having similar chemical and electrical characteristics and similar responses to changing physical and electrical environments.

58. The gauge of claim 57, wherein:
said inert conductive substance on one of the shield or collector is a material selected from the group consisting of gold, platinum, and rhodium, mixtures of these, and alloys comprising gold, platinum or rhodium,
said inert conductive substance on the other of the shield or collector is a different material selected from the group consisting of gold, platinum, and rhodium, mixtures of these, and alloys comprising gold, platinum or rhodium, than that employed on the first one of the shield or collector.

59. The gauge of claim 57, wherein:
the housing conductive substance electrical potential is within the range from about zero volts to about −50 volts.

60. The gauge of claim 59, wherein:
the grid is operated at an applied electrical potential of about +190 volts;
the cathode is operated at an applied potential of about +30 volts, and the collector is operated at about ground potential.

61. The gauge of claim 57, wherein:
the collector electrode takes a geometric form that is non-linear, at least one portion of which is disposed between the grid and the housing for gathering photoelectrons that do not penetrate the grid.

62. The gauge of claim 57, wherein:
the collector is formed from at least two elongated wires, a first wire being disposed within the grid, and the second wire being disposed between the grid and the housing.

63. A Bayard-Alpert type gas pressure measuring gauge providing neutralization of the total x-ray effect in the measurement result by balancing the forward x-ray effect and the reverse x-ray effect, said gauge comprising:
a plurality of electrodes within a housing, said electrodes comprising a grid anode, a cathode, a collector and a shield, each of said electrodes having a connection to a respective electrical lead by which electrical potential may be applied individually to each of said electrodes from outside the gauge;
said shield and said collector each comprising different substantially inert conductive substances on their respective exposed surfaces within the gauge, with each of said inert conductive substances having similar chemical and electrical characteristics and similar responses to changing physical and electrical environments.

64. The gauge of claim 63, wherein:
said inert conductive substance on one of the shield or collector is a material selected from the group consisting of gold, platinum, and rhodium, mixtures of these, and alloys comprising gold, platinum or rhodium, said inert conductive substance on the other of the shield or collector is a different material selected from the group consisting of gold, platinum, and rhodium, mixtures of these, and alloys comprising gold, platinum or rhodium, than that employed on the first one of the shield or collector.

65. A method of operating a Bayard-Alpert type pressure measuring gauge to neutralize the total x-ray effect in the measurement result by balancing the forward x-ray effect and the reverse x-ray effect, said gauge comprising a grid anode, a cathode, an ion collector and a conductive shield on a housing, said method comprising the steps:

fabricating the collector and the conductive shield from the same substantially inert conductive substance;

applying a potential to the shield that is negative with respect to the collector potential;

applying a potential to the grid that is about 190 volts more positive than the collector potential;

applying a potential to the cathode that is about 30 volts more positive than the collector potential;

neutralizing the total x-ray effect by adjusting the shield potential until the gauge measurement at a pressure on the order of $10^{-11}$ to $10^{-12}$ Torr is as close as possible to the measurement obtained by a calibrated standard instrument.

66. The method of claim 65, wherein the method further comprises:

selecting the substantially inert conductive substance from the group of materials consisting of gold, platinum, and rhodium, mixtures thereof, and alloys comprising gold, platinum or rhodium.

67. The method of claim 65, wherein the method further comprises:

selecting the substantially inert conductive substance from the group of materials consisting of the oxides of indium, chromium, vanadium and tin, mixtures thereof, and alloys comprising an oxide of indium, chromium, vanadium or tin.

68. The method of claim 65, wherein the method further comprises:

fabricating the collector in a geometric shape that is non-linear, at least one portion of which is disposed between the grid and the housing for gathering photoelectrons that do not penetrate the grid.

69. The method of claim 65, wherein the method further comprises:

fabricating the collector is from at least two elongated wires, a first wire being disposed within the grid, and the second wire being disposed between the grid and the housing.

70. A Bayard-Alpert type gas pressure measuring gauge providing neutralization of the total x-ray effect in the measurement result by balancing the forward x-ray effect and the reverse x-ray effect, said gauge comprising:

a glass enclosure containing a plurality of electrodes, said glass enclosure having a conductive coating on at least a portion of its exterior surface to allow control of an equipotential conductive shield on the inside of the glass enclosure, said external coating having a connection to an electrical lead by which electrical potential may be applied by conduction through the glass to the internal shield;

said glass enclosure having a port for communication with a space in which gas pressure is to be measured;

said plurality of electrodes comprising a grid, a cathode and a collector, each of said electrodes having a connection to a respective electrical lead by which electrical potential may be applied individually to each of said electrodes from outside the gauge;

said shield coating and said collector each comprising the same substantially inert conductive substance on their respective surfaces that are exposed to each other.

71. The gauge of claim 70, wherein:

said inert conductive substance on the shield and collector is a material selected from the group consisting of gold, platinum, rhodium, mixtures thereof, and alloys comprising gold, platinum, or rhodium.

72. The gauge of claim 70, wherein:

said inert conductive substance on the shield and collector is a material selected from the group consisting of the oxides of indium, chromium, vanadium, tin, mixtures thereof, and alloys comprising the oxides of indium, chromium, vanadium, or tin.

73. The gauge of claim 70, wherein:

the shield is operated at a negative potential with respect to the collector for enhancing the reverse x-ray effect.

74. The gauge of claim 70, wherein:

the shield potential is within the range from about zero volts to about −50 volts.

75. The gauge of claim 74, wherein:

the grid is operated at an applied electrical potential of about +190 volts;

the cathode is operated at an applied potential of about +30 volts; and the collector is operated at about ground potential.

76. The gauge of claim 70, wherein:

the collector electrode takes a geometric form that is non-linear, at least one portion of which is disposed between the grid and the glass enclosure for gathering photoelectrons that do not penetrate the grid.

77. The gauge of claim 70, wherein:

the collector is formed from at least two elongated wires, a first wire being disposed within the grid, and the second wire being disposed between the grid and the glass enclosure.

78. A Bayard-Alpert type gas pressure measuring gauge providing neutralization of the total x-ray effect in the measurement result by balancing the forward x-ray effect and the reverse x-ray effect, said gauge comprising:

a glass enclosure containing a plurality of electrodes, said glass enclosure having a conductive coating on at least a portion of its exterior surface forming an equipotential shield on the glass enclosure, said shield having a connection to an electrical lead by which electrical potential may be applied to the shield;

said glass enclosure having a port for communication with a space in which gas pressure is to be measured;

said plurality of electrodes comprising a grid, a cathode and a collector, each of said electrodes having a connection to a respective electrical lead by which electrical potential may be applied individually to each of said electrodes from outside the gauge;

said shield and said collector each comprising different substantially inert conductive substances on their respective surfaces exposed to each other, with each of said inert conductive substances having similar chemical and electrical characteristics and similar responses to changing physical and electrical environments.

79. The gauge of claim 78, wherein:

said inert conductive substance on one of the shield or collector is a material selected from the group consisting of gold, platinum, and rhodium, mixtures of these, and alloys comprising gold, platinum or rhodium, said inert conductive substance on the other of the shield or collector is a different material selected from the group consisting of gold, platinum, and rhodium, mixtures of these, and alloys comprising gold, platinum or rhodium, than that employed on the first one of the shield or collector.

80. The gauge of claim 78, wherein:

the shield is operated at a negative potential with respect to the collector for enhancing the reverse x-ray effect.

81. The gauge of claim 78, wherein:

the shield potential is within the range from about zero volts to about −50 volts.

82. The gauge of claim 81, wherein:

the grid is operated at an applied electrical potential of about +190 volts;

the cathode is operated at an applied potential of about +30 volts; and the collector is operated at about ground potential.

83. The gauge of claim 78, wherein:

the collector electrode takes a geometric form that is non-linear, at least one portion of which is disposed between the grid and the glass enclosure for gathering photoelectrons that do not penetrate the grid.

84. The gauge of claim 78, wherein:

the collector is formed from at least two elongated wires, a first wire being disposed within the grid, and the second wire being disposed between the grid and the glass enclosure.

85. A method for correcting the total x-ray effect present in a measurement result of a Bayard-Alpert type gas pressure measuring gauge, said gauge comprising a grid anode, a cathode, an ion collector, and a conductive substance shield at least partially surrounding the grid, cathode and collector, each of these respective elements having an electrical lead for application of an electrical potential, said method accomplished by modulating the potential of the shield, said method comprising the steps:

setting the shield electrical potential to approximately the same value as the cathode potential;

taking an initial measurement H of the total gas pressure in a very high vacuum space, where H is the sum of the true pressure P and the forward x-ray effect F in the gauge, and comparing the measurement result H to a reference measurement obtained for the same very high vacuum space using a reference measuring device, such as an Extractor gauge;

calculating the difference F between the initial gauge measurement and the reference measurement, where F is the forward x-ray effect error in the gauge;

setting the shield potential to a value more negative than the cathode potential;

taking a second measurement L of the total gas pressure with the Bayard-Alpert type gauge, said measurement L representing the initial measured value H minus a fraction f of the forward x-ray effect F, as in the relation $L=H-fF$;

calculating the difference between the initial measurement H and the second measurement L, and calculating the fraction f of the forward x-ray effect F that was canceled in the second measurement, as in the relation $f=(H-L)/F$;

for any subsequent measurement, modulating the shield potential between first and second values, the first value being the cathode potential and the second value being the same negative potential difference used in the calibration steps, taking first and second measurements H and L of gauge pressure, H with the shield potential at the first value, and L with the shield potential at the second value, and applying a correction to arrive at the true pressure P according to the relation $P=H-(H-L)/f$, where f is the previously calculated fraction of the forward x-ray effect canceled when the shield potential is modulated to the more negative value.

86. A method according to claim 85, wherein said step of setting the shield potential to a value more negative than the cathode potential comprises setting the shield potential to a value about twenty volts more negative than the cathode potential.

* * * * *